United States Patent
Zhang et al.

[11] Patent Number: 5,953,407
[45] Date of Patent: Sep. 14, 1999

[54] DISTINCTIVE RINGING AND DISTINCTIVE CALL-WAITING TONES IN AN ISDN

[75] Inventors: Genzao Zhang, Vanier; Howard Martin Sandler, Ottawa; Shahram Dowlatshahi, Kanata, all of Canada

[73] Assignee: Nortel Networks Corporation, Montreal, Canada

[21] Appl. No.: 08/760,989

[22] Filed: Dec. 5, 1996

[51] Int. Cl.⁶ ................................................ H04M 3/02
[52] U.S. Cl. ..................... 379/373; 379/93.01; 455/414
[58] Field of Search ..................... 379/67, 89, 201, 379/207, 210, 211, 214, 142, 67.1, 215, 372, 373, 374, 375, 376; 455/414, 445, 461

[56] References Cited

U.S. PATENT DOCUMENTS

| | | | |
|---|---|---|---|
| 4,922,484 | 5/1990 | Yoshida et al. | 370/68.1 |
| 5,001,709 | 3/1991 | Satoh | 370/110.1 |
| 5,018,191 | 5/1991 | Catron et al. | 379/100 |
| 5,040,209 | 8/1991 | Greenberg et al. | 379/373 |
| 5,317,630 | 5/1994 | Feinberg et al. | 379/94 |
| 5,463,623 | 10/1995 | Grimes et al. | 370/79 |
| 5,491,744 | 2/1996 | Kikinis | 379/215 |
| 5,513,251 | 4/1996 | Rochkind et al. | 379/93 |
| 5,519,767 | 5/1996 | O'Horo et al. | 379/97 |
| 5,533,108 | 7/1996 | Harris et al. | 379/201 |
| 5,563,937 | 10/1996 | Bruno et al. | 379/201 |
| 5,563,943 | 10/1996 | Takebayashi et al. | 379/373 |
| 5,636,269 | 6/1997 | Eisdorfer | 379/215 |
| 5,655,016 | 8/1997 | Emery | 379/374 |
| 5,721,729 | 2/1998 | Klingman | 370/251 |
| 5,812,649 | 9/1998 | Shen | 379/215 X |

FOREIGN PATENT DOCUMENTS

| | | |
|---|---|---|
| 0 282 158 A2 | 9/1988 | European Pat. Off. . |
| 0 487 234 A2 | 5/1992 | European Pat. Off. . |
| 0 494 459 A2 | 7/1992 | European Pat. Off. . |
| 2 293 946 | 4/1996 | United Kingdom . |
| WO 95/31076 | 11/1995 | WIPO . |
| WO 96/35300 | 11/1996 | WIPO . |

OTHER PUBLICATIONS

Mouly et al., "The GSM System for Mobile Communications", 1992, pp. 523–525.

*Primary Examiner*—Scott Weaver

[57] ABSTRACT

In a multi-service wireless, or wired, integrated services digital network, the type-of-call information in a call setup message may indicate the call is a voice call, a fax call or a data call. This information is used to generate a distinctive ring at the called subscriber unit, provided the called subscriber unit is not busy with another call. If the called subscriber unit is busy with a voice call, then a distinctive call waiting tone signal is generated based on the type-of-call information.

12 Claims, 3 Drawing Sheets

DISTINCTIVE RINGING AND DISTINCTIVE CALL-WAITING TONES IN AN ISDN

FIELD OF THE INVENTION

This invention relates to a method for identifying non-voice calls in an integrated services digital network and, in a preferred form, for identifying non-voice calls in a multi-service wireless integrated services digital network. The invention also relates to a multi-service wireless integrated services digital network for identifying non-voice calls.

DESCRIPTION OF THE RELATED ART

In the public switched telephone network (PSTN), two or more destination numbers (DNs) may be assigned to one subscriber line and a distinctive ring and distinctive call-waiting tone allotted to each such DN. With this arrangement, one of these DNs could be considered a fax number and smart subscriber equipment could recognize the distinctive ring to the fax DN and route the call accordingly.

While this system functions adequately for the PSTN, it is not applicable for a multi-service wireless system, such as the global system for mobile communications (GSM) where signalling to subscriber equipment is conveyed out-of-band.

SUMMARY OF THE INVENTION

According to the present invention, there is provided, in an integrated services digital network, a method for identifying non-voice calls, comprising the steps of: receiving an indication of a called subscriber unit and an indication of a type-of-call, said type-of-call indication indicating said call is either a voice call or a non-voice call; constructing an out-of-band call setup message to said called subscriber unit, said call setup message including a voice or non-voice indication for said call based on said type-of-call indication; transmitting said call setup message to said called subscriber unit; at said called subscriber unit, if not busy with another call, generating a distinctive ring based on said indication in said call setup message and passing said distinctive ring to terminal equipment associated with said called subscriber unit.

In another aspect, there is provided, in a multi-service wireless integrated services digital network, a method for identifying non-voice calls, comprising the steps of: receiving an indication of a called subscriber unit and an indication of a type-of-call, said type-of-call indication indicating said call is either a voice call or a non-voice call; constructing an out-of-band call setup message to said called subscriber unit, said call setup message including a voice or non-voice indication for said call based on said type-of-call indication; transmitting said call setup message to said called subscriber unit; at said called subscriber unit, if not busy with another call, generating a distinctive ring based on said indication in said call setup message and passing said distinctive ring to terminal equipment associated with said called subscriber unit.

In a further aspect of the invention, there is provided a multi-service wireless integrated services digital network for identifying non-voice calls comprising: a base station subsystem for receiving an out-of-band call setup message from a mobile switching center for a called subscriber unit, said call setup message including a voice or non-voice indication for a call, said base station subsystem for sending said out-of-band call setup message to said called subscriber unit; said called subscriber unit, if not busy with another call, for generating a distinctive ring based on said indication in said call setup message and for passing said distinctive ring to associated terminal equipment.

DETAILED DESCRIPTION OF THE PREFERRED EMBODIMENTS

Figure 1:
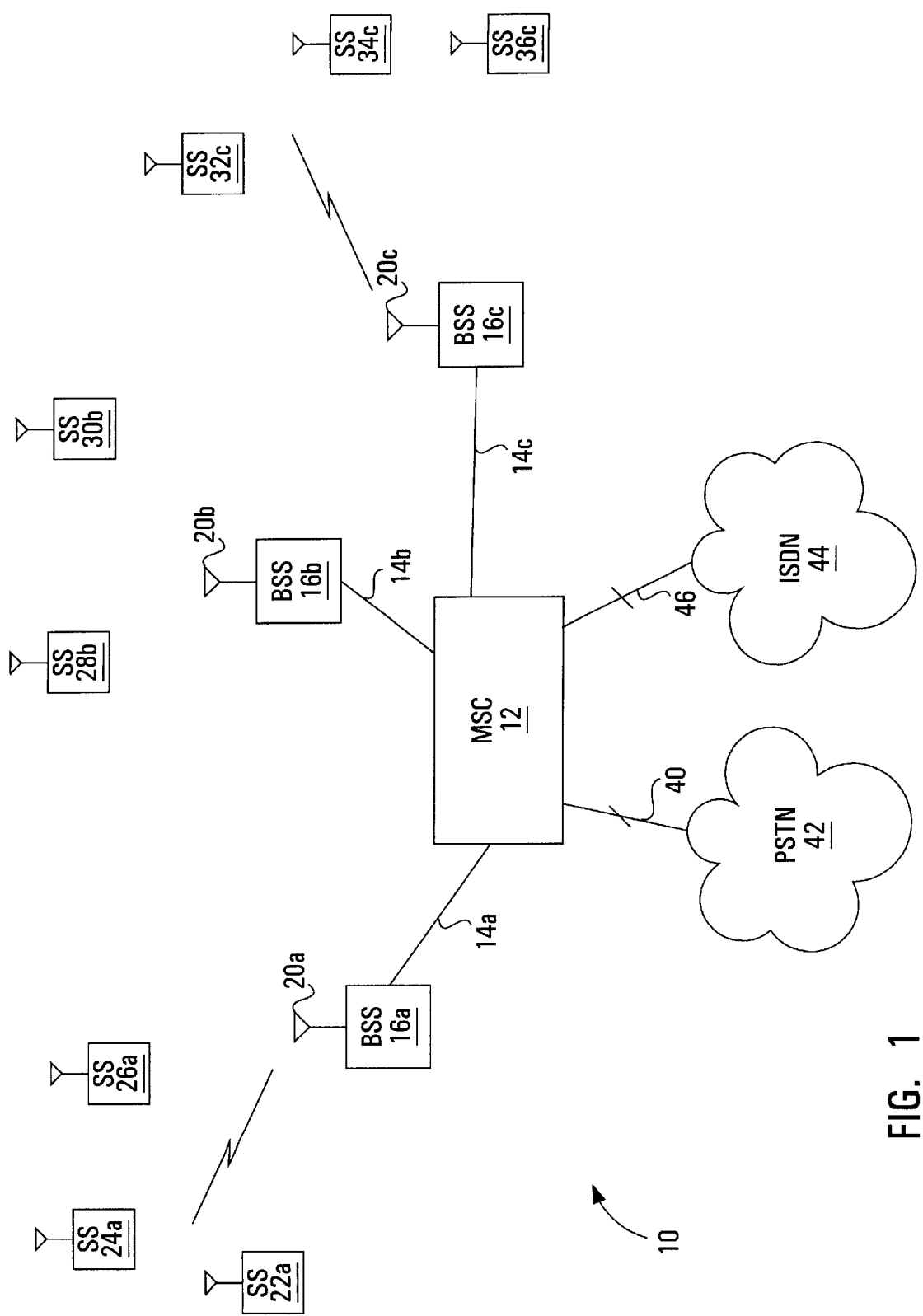
FIG. 1 is a schematic view of a GSM for use with the subject invention.

Turning to FIG. 1, a global system for mobile communications (GSM) 10 for use with the subject invention comprises a mobile switching centre (MSC) 12 connected on lines 14a, 14b, 14c to a plurality of base station subsystems (BSSs) 16a, 16b, and 16c, respectively. Each BSS has an antenna 20a, 20b, 20c, respectively, for communicating with any of a plurality of subscriber stations (SSs) associated therewith. More particularly, SSs 22a, 24a, and 26a are associated with BSS 16a, SSs 28b and 30b are associated with BSS 16b, and SSs 32c, 34c, and 36c are associated with BSS 16c. The MSC is also connected to the public switched telephone network (PSTN) 42 on trunks 40 and a wire line ISDN network 44 on trunks 46.

Figure 2:
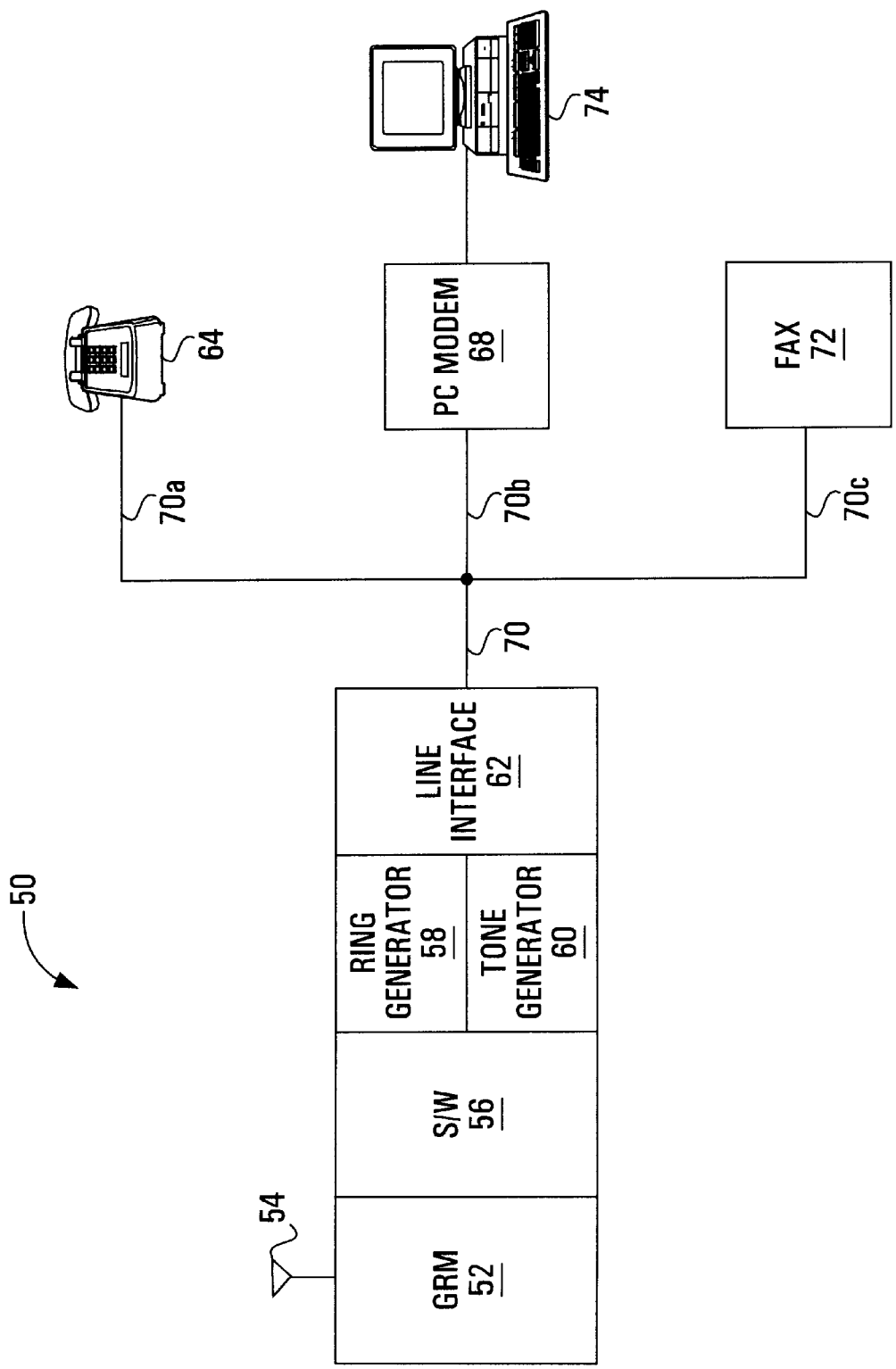
FIG. 2 is a schematic view detailing a portion of the GSM of FIG. 1.

An exemplary subscriber station is shown in FIG. 2. Turning to FIG. 2, the subscriber station comprises a subscriber unit (SU) 50 comprising a GSM radio module (GRM) 52 having an antenna 54 for the subscriber station, subscriber unit software 56, a ring generator 58, a tone generator 60, and a line interface 62. Several pieces of terminal equipment are connected to the line interface 62 of the SU on a shared wire line 70, namely telephone station apparatus 64 which is connected through branch line 70a of line 70 to the SU, personal computer (PC) modem 68 of PC 74 connected to the SU via branch line 70b of line 70, and fax machine 72 connected to the SU on branch 70c of line 70. As will be appreciated by those skilled in the art, typically, a single subscriber unit may be present in a home and numerous pieces of terminal equipment may be linked to it on a shared wire line via standard telephone jacks. The line interface 62 operates in a conventional fashion by, for example, supplying loop current and detecting whether any terminal equipment is off-hook.

Considering both FIGS. 1 and 2, if a user at SS 22a wishes to communicate with SS 34c, the user may key in the DN for SS 34c. Additionally, the user may key in the type of service requested, such as fax service. As will be appreciated by those skilled in the art, in a GSM different channels are used for each of fax, data, and voice communications. One known technique for indicating a type of service is to dial a prefix in advance of the DN. For example, "*9" dialled in advance of the DN may indicate a fax call, "*8", a data call, and no prefix, a voice call. A wireless link would then be set up between SS 22a and BSS 16a and the SU 50 of SS 22a would pass the indication of a called subscriber station and the indication of a type-of-call to BSS 16a. The BSS 16a passes this information on to MSC 12 over line 14a. On receipt of this information, the MSC 12 runs the procedure needed for call establishment to BSS 16c with which SS 34c is associated and then constructs and sends an out-of-band setup message which is a translation of the service requests (namely the DN for SS 34c and the type-of-call). The MSC starts establishment through the network and sends a "call proceeding" message back to SS 22a. Once BSS 16c has established a radio link with SS 34c, the BSS passes the out-of-band setup message to SS 34c and the MSC receives back from BSS 16c a report indicating, for example, that terminal equipment associated with SS 34c is ringing. The MSC responds by passing this information back to BSS 16a which, in turn, returns the information to SS 22a. If the call is accepted at SS 34c, then an "answering" message is received by the MSC. The MSC responds by passing a "connected" message to SS 22a via BSS 16a. Once the "connected" message is received by SS 22a, it connects the call through by completing the circuit transmission path.

The out-of-band setup message which indicates the type-of-call is called a bearer capability information element (BCIE); depending upon the network, the BCIE may be generated by SS 22a, BSS 16a, or MSC 12.

Figure 3:
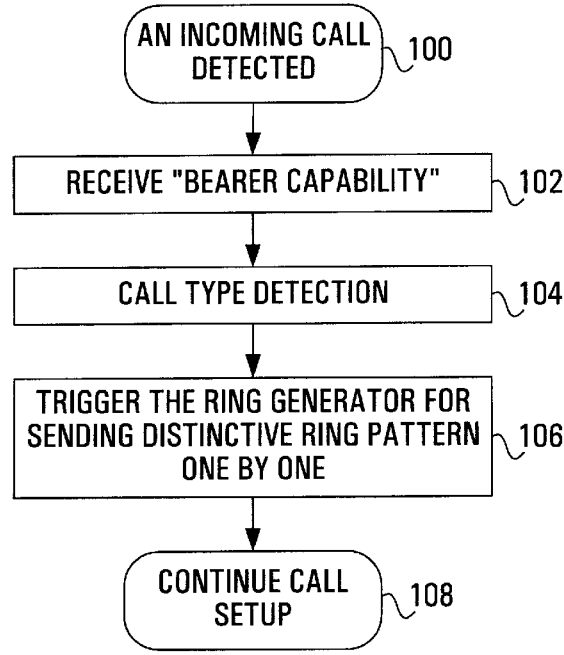
FIG. 3 is a flow diagram for operation of a called subscriber unit operating in accordance with an embodiment of this invention.

Turning to FIG. 3 along with FIG. 2, when an incoming call is detected at subscriber unit 50 (step 100), the software 56 of the SU receives the BCIE (step 102). The software determines the type-of-call from the BCIE (step 104). From this determination, the software 56 triggers the ring generator to send an appropriate distinctive ring to the terminal equipment associated with the subscriber unit (step 106) through line interface 62. For example, if the type-of-call indicated were a fax call, then a particular distinctive ring chosen for fax calls (for example, two short rings) would be generated by the ring generator. A user, recognising this distinctive ring, would decide not to answer the telephone handset 64 in this case, but rather, would allow the fax machine to pick up. Call setup would then proceed in the usual fashion (step 108).

Figure 4:
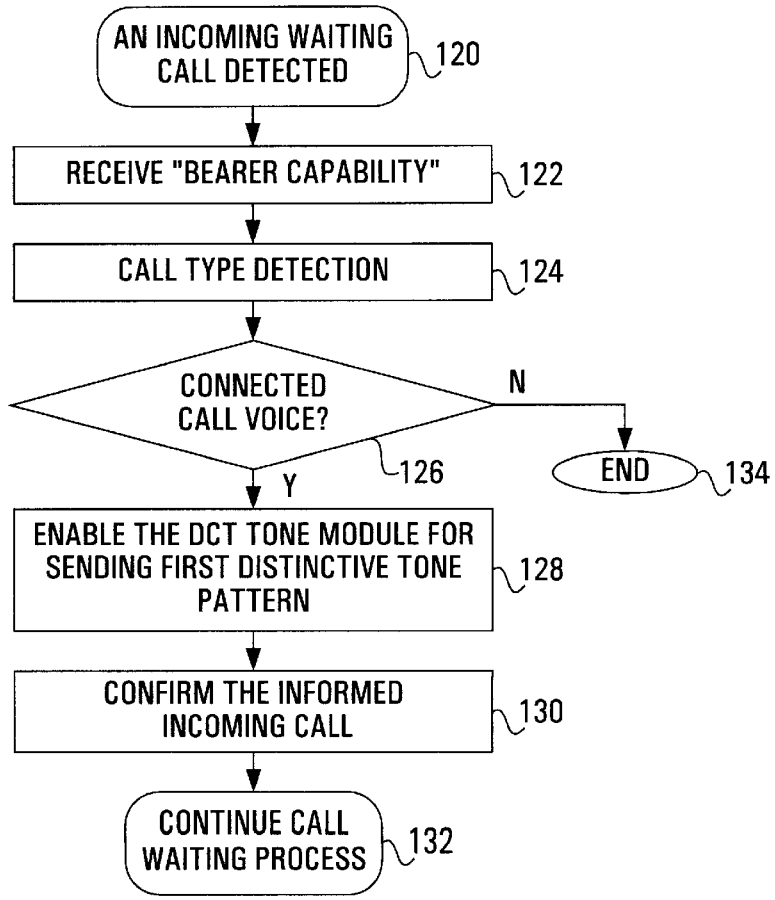
FIG. 4 is a further flow diagram of the operation of a called subscriber unit operating in accordance with an embodiment of this invention.

It may be that when the MSC sends the call setup message to BSS 16c, SS 34c is in use because one of telephone station apparatus 64, PC 68 or fax machine 72 is busy with a prior call. In such case, turning to FIG. 4 along with FIG. 2, the new call is detected by software 56 of subscriber unit 50 of subscriber station 34c (step 120). The BCIE of the new call is extracted from the call setup message (step 122) and the software 56 determines the type-of-call from this BCIE (step 124). Software 56 next determines whether the connected (prior) call is a voice call—i.e., a call engaging telephone station apparatus 64—or a non-voice call (step 126). This may be accomplished by software 56 monitoring line 70 or by storing the BCIE of the connected call. If the connected prior call is a voice call, then software 56 then enables the tone generator 60 to output a distinctive tone pattern indicating the type-of-call which is waiting (step 128). Software 56 then returns a message to MSC 12 indicating that the called party is being alerted (step 130). This message is passed back to SS 22a and the distinctive call-waiting tone is intermittently generated by software 56, up to a preset maximum period of time, while service continues to be requested by SS 22a and until SS 34c becomes free to receive the new call (which may occur by the original call being placed on hold and the new call answered or the original call being terminated). If the connected call is not a voice call, then software 56 generates no distinctive call-waiting tone in respect of the waiting call (step 134).

Normally a user will wish to continue a voice call in preference to a fax or data call. In view of this, as an option, software 56 may be configured to generate no distinctive call-waiting tone on receiving a new call which is not a voice call. In such case, software 56 may pass a message back indicating the called party is not reachable.

Refraining from generating a call-waiting tone where the connected call is a non-voice call avoids the prospect of degrading a data or fax transmission of a connected call. There are some instances, however, where a call-waiting tone could be considered for a non-voice call. This would be an option where, for example, PC 68 was able to recognize call-waiting tones without degradation of the existing data transmission. A call-waiting tone could be useful where the PC was engaged in an internet phone call to alert the user of the waiting call.

The distinctive ring can be different for each of a voice, fax, and data type-of-call. Similarly, the distinctive call-waiting tone can be different for each of a voice, data, and fax type-of-call.

A wire line ISDN 44 is provisioned with subscriber units each of which is connected to a switch over a wire line; a BCIE is generated in such a network during call set-up. Thus, an incoming call from a wire line ISDN 44 to MSC 12 may be treated in the same fashion as an incoming call from a BSS 16a, 16b, 16c.

An incoming call from an analog portion of a PSTN presents difficulties as no type-of-call information can be included out-of-band. One solution for allowing analog PSTN calls to the GSM network of the subject invention is to designate different PSTN phone numbers for different types of call to a single SS. Thus, for example, there may be one phone number for fax calls to an SS, one for data calls, and one for voice calls. When MSC 12 receives one of these phone numbers over line 40, it may utilize a look-up table which will translate that phone number to a number indicating the particular SS and a type-of-call indication. With this information, the MSC may generate a standard call setup message to the appropriate BSS.

While lines 14a, 14b, and 14c are indicated as wire lines, it will be recognized that these could be replaced with wireless links. Further, while the call setup message has been described as being generated by the MSC, equally, it could be generated by the calling SS or its associated BSS.

The present invention has been described for use with a GSM. It will be appreciated, however, that it would have equal application to other multi-service wireless integrated services digital networks. Furthermore, it also has application to multi-service wire line integrated services digital networks since a type-of-call BCIE is also generated in such networks which could be used by software at the called subscriber station to generate distinctive rings or call-waiting tones as aforedescribed.

Other modifications will be apparent to those skilled in the art and, therefore, the invention is as defined in the claims.

What is claimed is:

1. In an integrated services digital network, a method for identifying non-voice calls comprising:

receiving an indication of a called subscriber unit and an indication of type-of-call, said type-of-call indication indicating said call is either a voice call or a non-voice call;

constructing an out-of-band call setup message to said called subscriber unit, said call setup message including a voice or non-voice indication for said call based on said type-of-call indication;

transmitting said call setup message to said called subscriber unit;

at said called subscriber unit, if not busy with another call, generating a distinctive ring signal based on said indication in said call setup message; and at said called subscriber unit, if busy with a voice call, generating a distinctive call-waiting tone signal based on said indication in said call setup message.

2. The method of claim 1 wherein said type-of-call indication, when indicating said call is a non-voice call, indicates said call as one of a fax and data call and wherein the step of generating a distinctive call-waiting tone signal based on said indication in said call setup message comprises generating a voice indicating distinctive call-waiting tone signal if said call setup message indicates a voice call, a fax indicating distinctive call-waiting tone signal if said call setup message indicates a fax call, and a data indicating distinctive call-waiting tone signal if said call setup message indicates a data call.

3. In an integrated services digital network, a method for identifying non-voice calls comprising:

receiving an indication of a called subscriber unit and an indication of type-of-call, said type-of-call indication indicating said call is either a voice call or a non-voice call;

constructing an out-of-band call setup message to said called subscriber unit, said call setup message including a voice or non-voice indication for said call based on said type-of-call indication;

transmitting said call setup message to said called subscriber unit; and at said called subscriber unit, if not busy with another call, generating a distinctive ring signal based on said indication in said call setup message;

wherein said type-of-call indication, when indicating said call is a non-voice call, indicates said call is one of a fax and data call and wherein the step of generating a distinctive ring signal based on said indication in said call setup message comprises generating a voice indicating distinctive ring signal if said call setup message indicates a fax call, and a data indicating distinctive ring signal if said call setup message indicates a data call.

4. In an integrated services digital network, a method for identifying non-voice calls comprising:

receiving an indication of a called subscriber unit and an indication of type-of-call, said type-of-call indication indicating said call is either a voice call or a non-voice call;

constructing an out-of-band call setup message to said called subscriber unit, said call setup message including a voice or non-voice indication for said call based on said type-of-call indication;

transmitting said call setup message to said called subscriber unit;

at said called subscriber unit, if not busy with another call, generating a distinctive ring signal based on said indication in said call setup message; and at said called subscriber unit, if busy with a voice call, generating a distinctive call-waiting tone signal if said indication in said call setup message indicates a voice call and not generating any tone signal if said indication in said call setup message indicates a non-voice call.

5. In a multi-service wireless integrated services digital network, a method for identifying non-voice calls comprising:

receiving an indication of a called subscriber unit and an indication of type-of-call, said type-of-call indication indicating said call is either a voice call or a non-voice call;

constructing an out-of-band call setup message to said called subscriber unit, said call setup message including a voice or non-voice indication for said call based on said type-of-call indication;

transmitting said call setup message to said called subscriber unit;

at said called subscriber unit, if not busy with another call, generating a distinctive ring signal based on said indication in said call setup message; and at said called subscriber unit, if busy with a voice call, generating a distinctive call-waiting tone signal based on said indication in said call setup message.

6. The method of claim 5 wherein said type-of-call indication, when indicating said call is a non-voice call, indicates said call as one of a fax and data call and wherein the step of generating a distinctive call-waiting tone signal based on said indication in said call setup message comprises generating a voice indicating distinctive call-waiting tone signal if said call setup message indicates a voice call, a fax indicating distinctive call-waiting tone signal if said call setup message indicates a fax call, and a data indicating distinctive call-waiting tone signal if said call setup message indicates a data call.

7. In a multi-service wireless integrated services digital network, a method for identifying non-voice calls comprising:

receiving an indication of a called subscriber unit and an indication of type-of-call, said type-of-call indication indicating said call is either a voice call or a non-voice call constructing an out-of-band call setup message to said called subscriber unit, said call setup message including a voice or non-voice indication for said call based on said type-of-call indication;

transmitting said call setup message to said called subscriber unit; and at said called subscriber unit, if not busy with another call, generating a distinctive ring signal based on said indication in said call setup message; and wherein said type-of-call indication, when indicating said call is a non-voice call, indicates said call as one of a fax and data call and wherein the step of generating a distinctive ring signal based on said indication in said call setup message comprises generating a voice indicating distinctive ring signal if said call setup message indicates a voice call, a fax indicating distinctive ring signal if said call setup message indicates a fax call, and a data indicating distinctive ring signal if said call setup message indicates a data call.

8. In a multi-service wireless integrated services digital network, a method for identifying non-voice calls comprising:

receiving an indication of a called subscriber unit and an indication of type-of-call, said type-of-call indication indicating said call is either a voice call or a non-voice call;

constructing an out-of-band call setup message to said called subscriber unit, said call setup message including a voice or non-voice indication for said call based on said type-of-call indication;

transmitting said call setup message to said called subscriber unit;

at said called subscriber unit, if not busy with another call, generating a distinctive ring signal based on said indication in said call setup message; and at said called subscriber unit, if busy with a voice call, generating a distinctive call-waiting tone signal if said indication in said call setup message indicates a voice call and not generating any tone signal if said indication in said call setup message indicates a non-voice call.

9. A multi-service wireless integrated services digital network for identifying non-voice calls comprising:

a base station subsystem for receiving an out-of-band call setup message from a mobile switching centre for a called subscriber unit, said call setup message including a voice or non-voice indication for a call, said base station subsystem for sending said out-of-band call setup message to said called subscriber unit; and said called subscriber unit, if not busy with another call, for generating a distinctive ring signal based on said indication in said call setup message and for passing said distinctive ring signal to associated terminal equipment wherein said called subscriber unit is also for, if busy with a voice call, generating a distinctive call-waiting tone signal based on said indication in said call setup message and passing said distinctive call-waiting tone signal to voice terminal equipment associated with said called subscriber unit.

10. The network of claim 9 including a calling subscriber unit for generating an indication of the called subscriber unit and an indication of a type-of-call based on input received from associated terminal equipment.

11. A multi-service wireless integrated services digital network for identifying non-voice calls comprising:

a base station subsystem for receiving an out-of-band call setup message from a mobile switching centre for a called subscriber unit, said call setup message including a voice or non-voice indication for a call, said base station subsystem for sending said out-of-band call setup message to said called subscriber unit; and said called subscriber unit, if not busy with another call, for generating a distinctive ring signal based on said indication in said call setup message and for passing said distinctive ring signal to associated terminal equipment wherein said called subscriber unit is also for, if busy with a voice call, generating a distinctive call-waiting tone signal based on said indication in said call setup message and passing said distinctive call-waiting tone signal to voice terminal equipment associated with said called subscriber unit and not generating any tone signal if said indication in said call setup message indicates a non-voice call.

12. In an integrated services digital network, a method for identifying non-voice calls, comprising:

receiving an indication of a called subscriber unit and an indication of a type-of-call, said type-of-call indication indicating said call is either a voice call or a non-voice call;

constructing an out-of-band call setup message to said called subscriber unit, said call setup message including a voice or non-voice indication for said call based on said type-of-call indication;

transmitting said call setup message to said called subscriber unit;

at said called subscriber unit, if busy with a voice call, generating a distinctive call-waiting tone signal if said indication in said call setup message indicates a voice call and not generating any tone signal if said indication in said call setup message indicates a non-voice call.

* * * * *